Aug. 22, 1967 L. E. SODERQUIST 3,336,636
MOUNTING MOLD SECTIONS USED IN VULCANIZING PRESSES
Filed Oct. 23, 1965 3 Sheets-Sheet 1

INVENTOR.
LESLIE E. SODERQUIST
BY Hamilton & Cook
ATTORNEYS

INVENTOR.
LESLIE E. SODERQUIST

Aug. 22, 1967 L. E. SODERQUIST 3,336,636
MOUNTING MOLD SECTIONS USED IN VULCANIZING PRESSES
Filed Oct. 23, 1965 3 Sheets-Sheet 3

INVENTOR.
LESLIE E. SODERQUIST
BY *Hamilton & Cook*
ATTORNEYS

United States Patent Office 3,336,636
Patented Aug. 22, 1967

3,336,636
MOUNTING MOLD SECTIONS USED IN VULCANIZING PRESSES
Leslie E. Soderquist, Silver Lake, Ohio, assignor to McNeil Corporation, Akron, Ohio, a corporation of Ohio
Filed Oct. 23, 1965, Ser. No. 503,807
8 Claims. (Cl. 18—43)

The present invention relates generally to improvements for mounting mold sections used in vulcanizing presses. Specifically, the invention is used for mounting the movable mold sections of a dual press for shaping and curing unvulcanized tire bands although principles thereof may be used for any press wherein rubber or similar plastic material is subjected to pressure and/or heat when between or within mold components.

In the embodiment of the invention disclosed herein, the press is a dual press having two sets of mold components; also referred to as mold pairs, sections or halves. The upper mold sections are supported beneath a movable press head. The lower mold sections are carried on the base of the press. A change in product size, shape or style requires a change in the mold components. When the press is open, there is easy access from above to change the lower mold sections. However, change of the heavy upper mold sections, which are below the movable press head, has heretofore been time consuming and difficult.

The principal object of the invention is to provide tire manufacturers with a press that is readily and easily adaptable to handle the proliferation of tire sizes required by today's market. The tire press is productive only when actually shaping and vulcanizing tire bands. The improvements afforded by the present invention will enable the tire manufacturer to convert or change the mold sections for a different size, shape or style of tire with a minimum of press down time.

It is a specific object of the invention to reduce the time and labor required to change the upper mold sections of a vulcanizing press; making mold change more efficient and also safer.

These and other objects of the invention, and the advantages over the prior art structures for mounting upper mold sections, will be apparent in view of the following detailed description and drawings.

*The press—General description*

Figure 1:
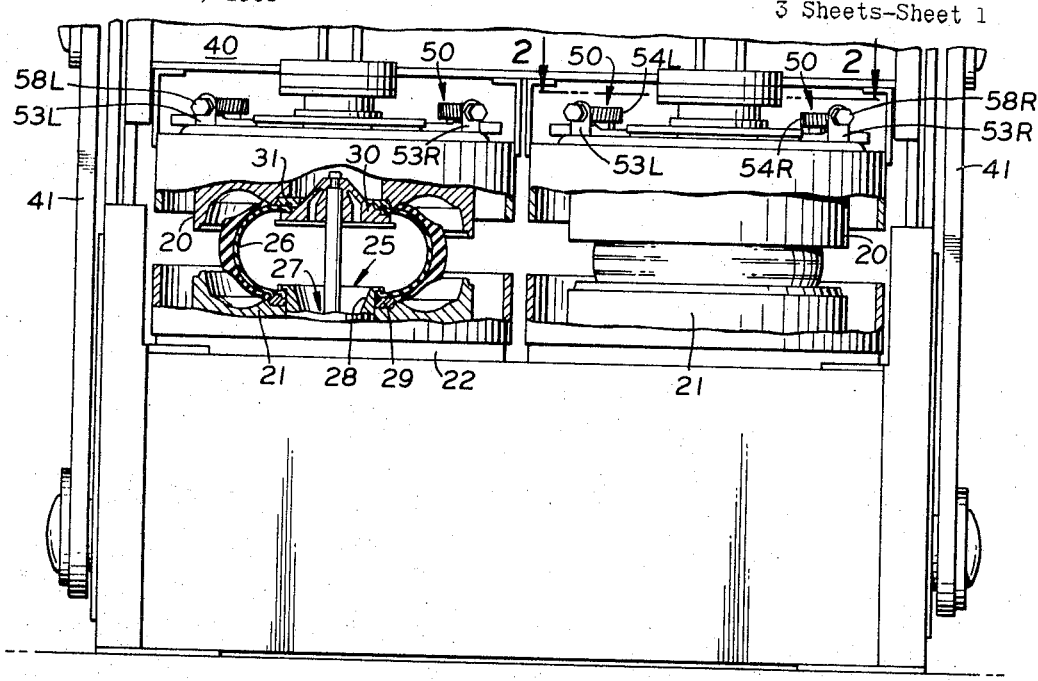
FIG. 1 is a fragmentary front view, showing in a dual tire press the two sets of mold sections, the press base, the movable press head and certain elements of the invention.

A tire curing press suitable for practice of the invention, as best shown in FIG. 1, has separable upper and lower mold sections, 20 and 21, and axially centered forming mechanisms or diaphragm-type shaping means. Presses of this type are well known to this art as shown in a number of prior art patents of the inventor, including United States Patent No. 2,808,618 to which reference is made for such details as are required to more fully understand the invention. These presses are constructed so that it is possible to obtain a maximum "tilt-back" of the upper mold sections and clearance above the lower mold sections without loss of valuable head room above the press.

The invention may also be used, for example, in presses wherein the upper mold section moves directly away from and then laterally of the lower mold section. Presses of this type are illustrated by United States Patent No. 3,097,394.

In a tire curing press, each lower mold section 21 is carried on a press bed plate or base 22. Below and coaxial with each mold section 21, the press base 22 has a central bore, or a well or reservoir, for the various operating mechanisms and structures of a center mechanism, indicated generally at 25, used during shaping and curing of tires.

Figure 3:
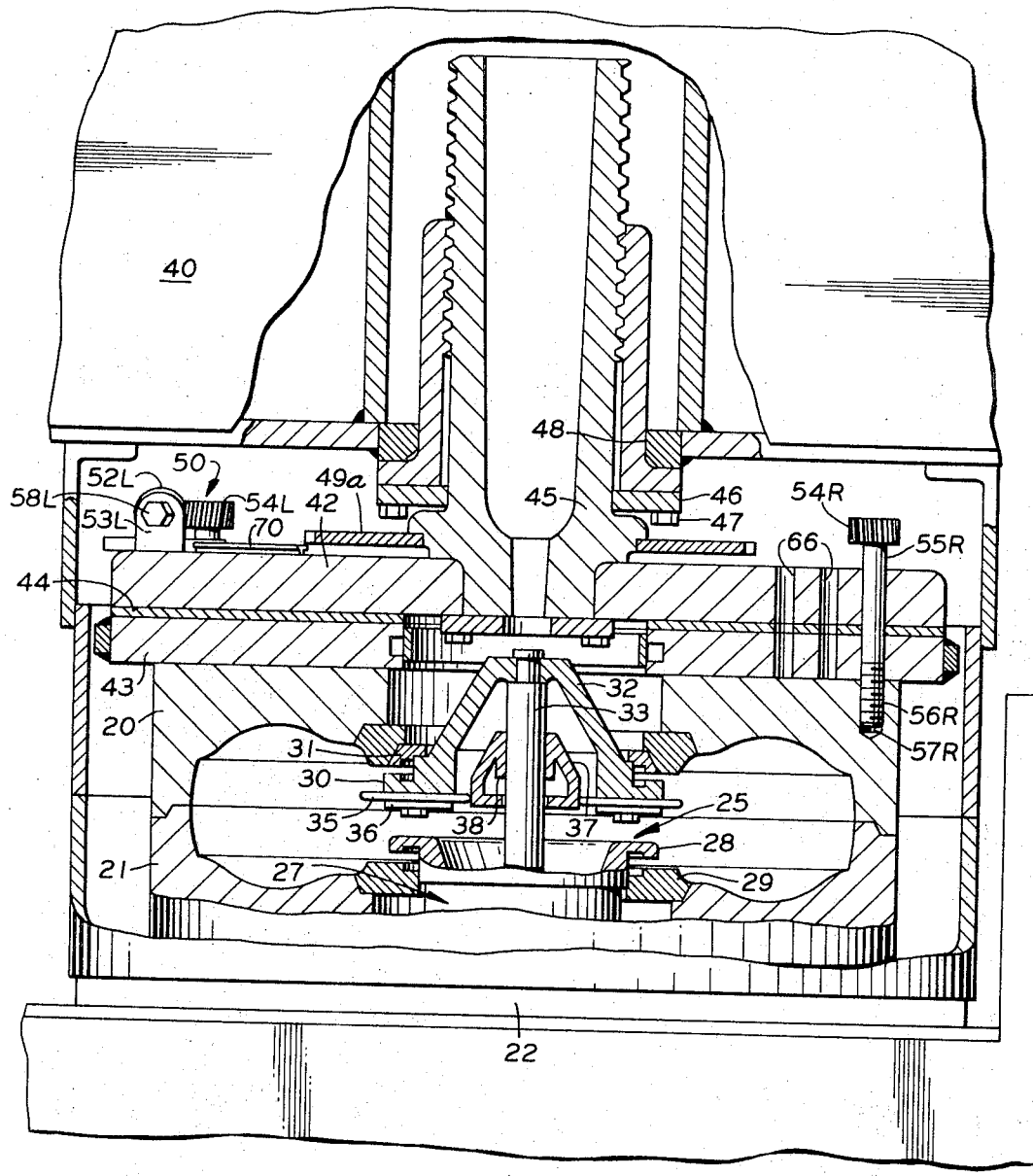
FIG. 3 is an enlarged sectional view of a press showing one set of molds in the closed position (without bag or tire for reasons of clarity)

Referring to FIG. 3, the center mechanism 25, which shapes the tire band during closing of the mold sections, strips the cured tire from the lower mold section at the end of the curing cycle. The center mechanism 25 has elements therein providing for a selective and controlled increase of the diameter of the permanent bag 26 which is between the beads of the cured tire or which is adjacent or near the upper mold section.

The permanent bag 26 is a deformable and radially distensible cylinder open at both ends. The center mechanism 25 is mounted axially of the lower mold section by a support member 27 attached to the press frame and extending downwardly through a press base well. The lower end of the bag 26 is closed by an assembly of a plate ring 28 and a bead ring 29 having suitably shaped circular grooves for clamping and closing the end portion of the bag. The upper end of the bag 26 is closed by an assembly of a plate ring 30 and a clamp ring 31.

The plate ring 30 is a circular member having a diameter less than the smallest diameter of an uncured tire band or a cured tire. The hub portion 32 of the plate ring is secured to the upper end of a shaft 33 carried by a piston and cylinder assembly (not shown) mounted axially of the support member 27 within the press base well.

Adjacent the under surface of the plate ring 30 are a plurality of radially movable elements or sectiorial segments 35 to increase or expand the diameter of the bag 26 to a dimension greater than the smallest diameter dimension of a cured tire. The segments 35 are movably secured beneath the ring 30 as by a circular ring member 36. The segments 35 may be moved radially outwardly to expand the bag 26 by an actuator means or elements 37 movable longitudinally in relation to the shaft 33.

The actuator element 37 may be a plug or bullet-shaped member having a conical upper surface for sliding contact with the radially inner ends of the segments 35. The actuator 37 is carried by a cylindrical sleeve 38 surrounding the shaft 33 carried by a piston (not shown) mounted in the same cylinder and above the piston carrying the shaft 33. Fluid pressure introduced into the cylinder will provide for relative movement of the shaft 33 and actuator 37 so that the cured tire may be stripped from the lower mold 21 and made ready for operation of the unloader apparatus (not shown).

The upper or movable mold sections 20 are carried beneath a heavy cross beam 40 actuated as by side links 41 to open and close the press. Beneath the cross beam 40 is an upper platen or mold support assembly, one for each pair of mold sections, 20 and 21. As shown in FIG. 3, the mold support assembly includes an upper platen 42 and a lower platen 43, insulated as by a disk 44 of asbestos or equivalent material and joined together as an assembly by any suitable means.

The upper platen 42 is securely attached to the lower end of an adjusting sleeve 45. The sleeve 45 is carried within a ring 46 securely attached as by bolts 47 to a large diameter bore 48 opening downwardly from the underside of a cross beam 40. Suitable adjusting means such as a ring gear 49a attached to the sleeve 45, and a pinion 49b rotatably mounted on the upper side or face of the platen 42, may be provided to adjust the press for different mold section of varying thickness.

The press elements 40 through 49b, described above are shown in the United States Patent No. 2,808,618, referred to above; see also United States Patents No. 2,358,763 and No. 2,358,764 for elements 45 through 49b.

*The upper mold mounting*

Figure 2:
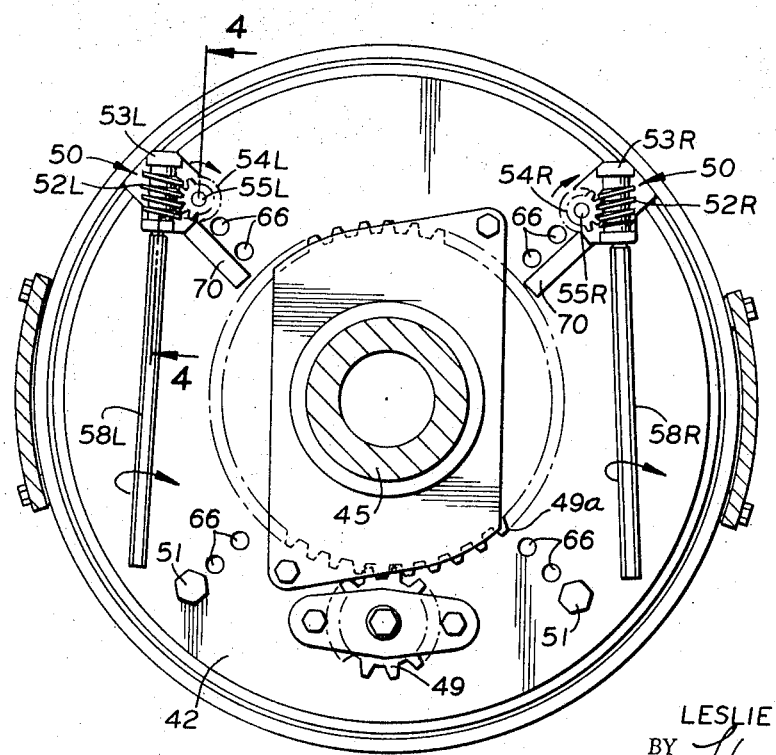
FIG. 2 is a top plan view of one upper mold section, taken substantially as indicated on line 2—2 of FIG. 1.

The mold mounting 50 provides for two-point attachment of the inner or rear portion of an upper mold section 20. At the outer or front of the press, on the unobstructed side of the cross beam 40, the outer portion of an upper mold section 20 is attached to the underside of a platen 43 as by manually inserted and fastening bolts 51. (See FIG. 2).

The mold mounting 50 include two worm gears, 52L and 52R. Each worm gear 52 is mounted in a journal block, 53L and 53R. Each journal block 53 carries a pinion or worm wheel, 54L and 54R, matingly engaging its respective worm gear 52. Each pinion 54 is carried on the upper end of a mounting bolt, 55L and 55R, having a lower end, 56L and 56R, with exterior threads rotatively engaging interior threads of an upper mold section bore, 57L and 57R. Each worm gear 52 is selectively rotated by an actuator shaft, 58L and 58R, extending to the front of the press, beneath the cross beam 40.

Figure 4:
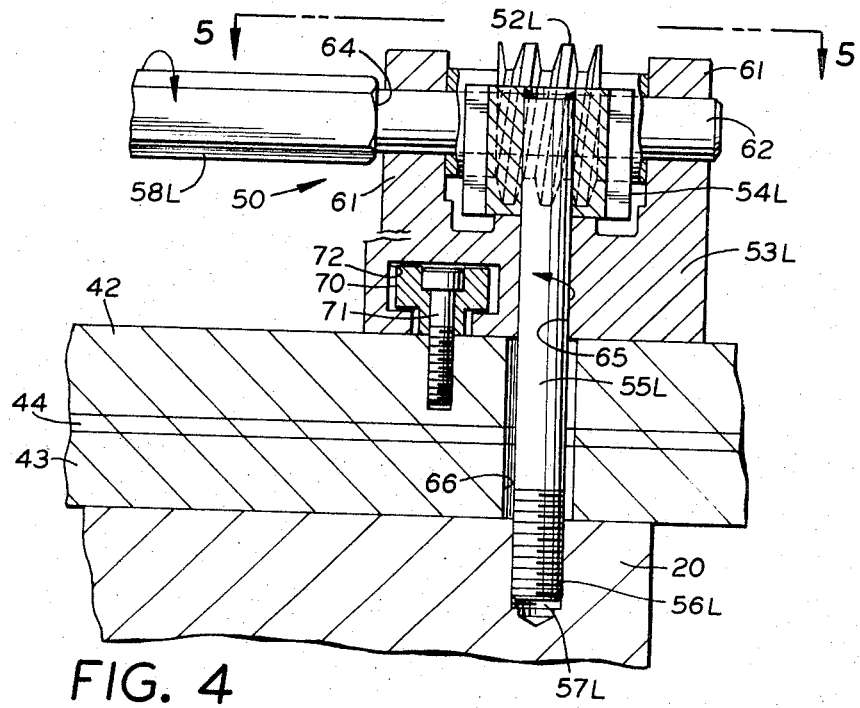
FIG. 4 is an enlarged vertical section taken substantially on line 4—4 of FIG. 2.
Figure 5:
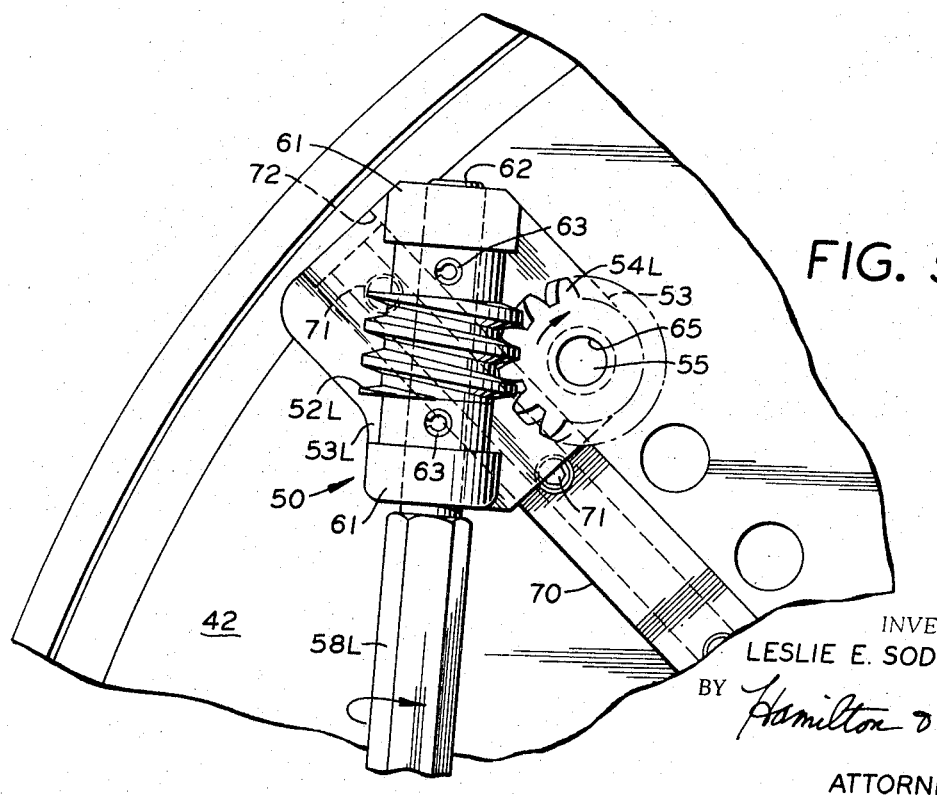
FIG. 5 is an enlarged view in plan, taken substantially as indicated on line 5—5 of FIG. 4.

As best shown in FIGS. 4 and 5, a journal block 53 is generally rectangular carrying opposed stanchions 61 on diagonally opposite corners. The stanchions 61 have aligned bores receiving the axial shaft 62 for each worm gear 52. The worm gear 52 is secured to the shaft 62 as by roll pins 63. An actuating shaft 58 is attached as at 64 to the axial shaft 62. Between the stanchions 61 and transversely to one side of the worm gear 52, a journal block 53 has a bore 65 receiving and snugly enclosing an attachment bolt 55.

Each journal block 53 is mounted on the upper surface of a mold platen 42 for limited orbital or planetary movement above an access bore 66 extending transversely through the upper mold support assembly or platens 42 and 43 and insulation disk 44. As shown there are a series of three access bores 66, located on a radius extending from the exact center of a mold support assembly, so that various diameter mold sections 20 can be attached by a mold mounting 50. Each access bore 66 has a diameter greater than the diameter of an attachment bolt 55 so that the bolt will fit loosely therethrough and have a limited degree of lateral "play."

Each journal block 53 is attached to the upper surface of a mold platen 42 by a track or rail element 70. The journal block track 70 is oriented parallel and to one side of the radial center line of the access bores 66. As shown, the track 70 is a T-shaped element secured to the platen 42 as by a series of bolts 71. The track 70 is received with a corresponding or T-shaped recess 72 extending longitudinally through the under side of the journal block 53. The recess 72 is oversize in its transverse dimensions with respect to the corresponding surfaces of the track 70.

The mold mounting 50 may best be utilized to replace an upper mold section 20 while the press is closed. With the press in the position of FIG. 3, the front fastening bolts 51 are removed and the gear shafts 58 are actuated, from the front of the press, so that the attachment bolts 55 are rotated out of engagement with the interior threads in the mold section bores 57. The press may then be opened leaving the demounted upper mold section 20 resting on the lower mold section 21. The "old" mold section 20 is taken away as by overhead crane or other suitable hoist. The "old" lower mold section 21 is then also preferably changed.

Thereafter, the "new" mold section 20 is positioned on the lower mold section 21 so that the mold bores 57 are in approximate registry with the platen access bores 66. The press is then closed, the ring gear 49a is rotated, if necessary the front bolts 51 are reinserted and the shafts 58 are actuated by an operator standing in front of the press. The sliding mounting of a journal block 53 on a track 70 readily permits the attachment bolts 55 to be precisely aligned for engagement with the interior threads of the mold bores 57.

As shown, the threads of the worm gears 52 are pitched in opposite directions so that the actuating shafts 58 may both be rotated in the same direction during mold changing operations. However, the worm gears 52 could have the same pitch in which case the actuated shafts 58 would be rotated in opposite direction. A further modification could be to locate the pinions 54 on the radially outer side of the worm gears rather than on the radially inner side, as shown. Therefore, the true spirit and scope of the invention should be determined not by details but by a fair interpretation of the appended claims.

What is claimed is:

1. A mounting (50) for movable mold section (20) of a press, said press having a cross beam (40) and a mold support assembly (42–44) beneath said cross beam, characterized in that said mounting comprises, for said mold section, at least two journal blocks (53) mounted on the upper surface of said mold support assembly for limited orbital movement above access bores (66) extending transversely through said support assembly, that each said journal block has a gear drive means (52, 54), and that each said gear drive means selectively rotates an attachment bolt (55) enclosed within one of said journal blocks and extending through one of said access bores, and that each said attachment bolt has a lower end (56) with exterior threads rotatively engaging interior threads of abore (57) in said mold section.

2. A mounting according to claim 1 wherein each said gear drive means includes a worm gear (52) and a pinion (54) in mating engagement, each said pinion being on the upper end of one of said shaft attachment bolts (55).

3. A mounting according to claim 2 wherein each said journal block (53) is generally rectangular carrying opposed stanchions (61) on diagonally opposite corners, said stanchions having aligned bores receiving an axial shaft (62), said worm gear (52) being secured to said shaft (62).

4. A mounting according to claim 3 wherein each said journal block (53) has a bore (65) receiving and snugly enclosing said attachment bolt (55) and each said access bore (66) has a diameter greater than the diameter of said attachment bolt so that the bolt will fit loosely therethrough and have a limited degree of lateral play.

5. A mounting according to claim 2 wherein said worm gear (52) is selectively rotated by an actuator shaft (58), extending to the front of the press, beneath the cross beam (40).

6. A mounting according to claim 5 wherein the two worm gears (52) are pitched in opposite directions so that the actuator shafts (58) may be rotated in the same direction during mold changing operations.

7. A mounting according to claim 1 wherein each said journal block (53) is attached on the upper surface of said mold support assembly by a track element (70) received in a corresponding recess (7) extending through the underside of said block.

8. A mounting according to claim 5 wherein said truck element (70) is T-shaped and said recess (72) is oversize in its transverse dimension with respect to the corresponding surfaces of the track.

References Cited
UNITED STATES PATENTS

| | | | |
|---|---|---|---|
| 2,285,389 | 6/1942 | Bostwick | 18—17 |
| 2,345,838 | 4/1944 | Soderquist et al. | 18—17 |
| 2,358,762 | 9/1944 | Soderquist | 18—17 |
| 2,716,258 | 8/1955 | Sugg | 18—18 |
| 2,826,783 | 3/1958 | Robbins | 18—17 X |

J. SPENCER OVERHOLSER, *Primary Examiner.*
J. HOWARD FLINT, JR., *Examiner.*

UNITED STATES PATENT OFFICE
CERTIFICATE OF CORRECTION

Patent No. 3,336,636                          August 22, 1967

Leslie E. Soderquist

It is hereby certified that error appears in the above numbered patent requiring correction and that the said Letters Patent should read as corrected below.

Column 2, line 49, for "sectiorial" read -- sectorial --; column 4, line 38, before "movable" insert -- a --; line 52, for "abore" read -- a bore --; column 5, line 6, for "(7)" read -- (72) --; line 8, for "truck" read -- track --.

Signed and sealed this 11th day of March 1969.

(SEAL)
Attest:

Edward M. Fletcher, Jr.                                      EDWARD J. BRENNER

Attesting Officer                                                 Commissioner of Patents